(12) United States Patent
Nakanishi et al.

(10) Patent No.: US 10,281,775 B2
(45) Date of Patent: May 7, 2019

(54) DISPLAY DEVICE

(71) Applicant: Sharp Kabushiki Kaisha, Sakai, Osaka (JP)

(72) Inventors: Youhei Nakanishi, Sakai (JP); Masayuki Kanehiro, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/509,531

(22) PCT Filed: Aug. 28, 2015

(86) PCT No.: PCT/JP2015/074442
§ 371 (c)(1),
(2) Date: Mar. 8, 2017

(87) PCT Pub. No.: WO2016/039184
PCT Pub. Date: Mar. 17, 2016

(65) Prior Publication Data
US 2017/0276982 A1    Sep. 28, 2017

(30) Foreign Application Priority Data
Sep. 12, 2014    (JP) .................................. 2014-186744

(51) Int. Cl.
*G02F 1/13*    (2006.01)
*G02F 1/1343*    (2006.01)
(Continued)

(52) U.S. Cl.
CPC .......... *G02F 1/1343* (2013.01); *G02F 1/1333* (2013.01); *G02F 1/134309* (2013.01);
(Continued)

(58) Field of Classification Search
CPC .. G02F 1/1343; G02F 1/1333; G02F 2201/56; G09G 3/2003; G09G 3/3648; G09G 2300/0426
See application file for complete search history.

(56) References Cited

U.S. PATENT DOCUMENTS

2009/0102758 A1 *  4/2009  Anzai ................. G09G 3/3225
                                                           345/76
2010/0013853 A1    1/2010  Takatori
(Continued)

FOREIGN PATENT DOCUMENTS

JP      10-197851 A      7/1998
JP      2009-301018 A    12/2009
(Continued)

OTHER PUBLICATIONS

Official Communication issued in International Patent Application No. PCT/JP2015/074442, dated Nov. 10, 2015.

*Primary Examiner* — Liliana Cerullo
(74) *Attorney, Agent, or Firm* — Keating & Bennett, LLP

(57) ABSTRACT

A display device structure that, even if a plurality of non-display parts are formed in a pixel region, can display an image in the whole pixel region except the non-display parts is obtained. A display device 1 includes: a substrate (10) having a plurality of non-display parts in a pixel region (P); a plurality of source lines $(SL_1), (SL_2), \ldots, (SL_m)$; a plurality of gate lines $(GL_1), (GL_2), \ldots, (GL_m)$; a plurality of pixel electrodes; and a plurality of gate line drive circuits $(GD_k)$ formed in the pixel region (P) and connected to each of the gate lines $(GL_1), (GL_2), \ldots, (GL_m)$, for controlling a potential of the gate line $(GL_k)$. At least a source line interrupted by any of the plurality of non-display parts, among the source lines $(SL_1), (SL_2), \ldots, (SL_m)$ is supplied with a data signal from both ends thereof, and the source lines $(SL_1), (SL_2), \ldots, (SL_m)$ are each formed not to be interrupted by two or more of the plurality of non-display parts.

8 Claims, 14 Drawing Sheets

(51) Int. Cl.
- G09F 9/30 (2006.01)
- G09G 3/36 (2006.01)
- G02F 1/1333 (2006.01)
- G09G 3/20 (2006.01)
- G02F 1/1337 (2006.01)
- G02F 1/1362 (2006.01)

(52) U.S. Cl.
CPC ............ *G09F 9/30* (2013.01); *G09G 3/2003* (2013.01); *G09G 3/3648* (2013.01); *G09G 3/3677* (2013.01); *G02F 1/133707* (2013.01); *G02F 1/136286* (2013.01); *G02F 2201/56* (2013.01); *G09G 2300/0426* (2013.01); *G09G 2310/0286* (2013.01)

(56) References Cited

U.S. PATENT DOCUMENTS

| | | |
|---|---|---|
| 2012/0112988 A1 | 5/2012 | Nakanishi et al. |
| 2014/0197428 A1 | 7/2014 | Wang et al. |

FOREIGN PATENT DOCUMENTS

| | | |
|---|---|---|
| JP | 2012-103335 A | 5/2012 |
| JP | 2014-134766 A | 7/2014 |

\* cited by examiner

DISPLAY DEVICE

TECHNICAL FIELD

The present invention relates to a display device, and particularly to a display device having a plurality of non-display parts in a pixel region.

BACKGROUND ART

A display device in which a gate driver and a source driver are formed on two adjacent sides of an active-matrix substrate has been conventionally known. JP 2012-103335 A discloses a display device having an irregular hexagonal display region formed by cutting off corner portions of a rectangle. A gate driver and a source driver are located in the frame regions of two adjacent sides of a TFT substrate in this display device. In the TFT substrate, a plurality of scan lines extend in the horizontal direction from the side on which the gate driver is located, and a plurality of video signal lines extend in the vertical direction from the side on which the source driver is located. Each scan line is connected to the gate driver through wiring provided along the frame region of the TFT substrate.

DISCLOSURE OF THE INVENTION

In such a display device as described in JP 2012-103335 A, if a non-display part (e.g. a hole) is formed in the display region (pixel region), signal lines (source line and gate line) are interrupted by the non-display part, which makes it impossible to supply a signal to the whole pixel region. Particularly in the case where a plurality of non-display parts are formed in the pixel region, even when a signal is supplied from both ends of a signal line, the signal may be unable to be supplied to the whole pixel region. In detail, in the case where non-display parts are aligned, a signal cannot be supplied to the part between the non-display parts. Meanwhile, for example in the case of forming holes (non-display parts) in the pixel region to place buttons or the like, it is sometimes preferable to align the holes in terms of design, operability, etc.

An object of the present invention is to obtain a display device structure that, even in the case where a plurality of non-display parts are formed in a pixel region, can display an image in the whole pixel region except the non-display parts.

A display device disclosed here includes: a substrate having a plurality of non-display parts in a pixel region that displays an image; a plurality of source lines each supplied with a data signal from outside; a plurality of gate lines crossing the plurality of source lines; a plurality of pixel electrodes formed at respective intersection points of the plurality of source lines and the plurality of gate lines; and a plurality of gate line drive circuits formed in the pixel region and connected to each of the plurality of gate lines, for controlling a potential of the gate line. At least a source line interrupted by any of the plurality of non-display parts, among the plurality of source lines, is supplied with the data signal from both ends thereof, and the plurality of source lines are each formed not to be interrupted by two or more of the plurality of non-display parts.

According to the present invention, it is possible to obtain a display device structure that, even in the case where a plurality of non-display parts are formed in a pixel region, can display an image in the whole pixel region except the non-display parts.

EMBODIMENTS FOR CARRYING OUT THE INVENTION

Figure 1:
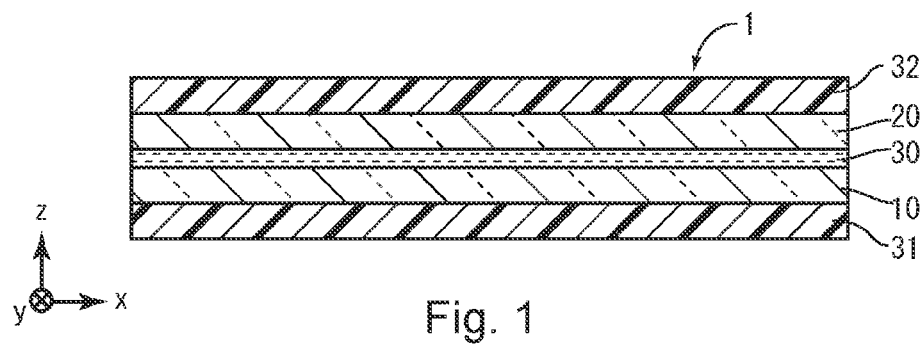
FIG. 1 is a sectional view illustrating the schematic structure of a display device according to a first embodiment of the present invention.

A display device according to an embodiment of the present invention includes: a substrate having a plurality of non-display parts in a pixel region that displays an image; a plurality of source lines each supplied with a data signal from outside; a plurality of gate lines crossing the plurality of source lines; a plurality of pixel electrodes formed at respective intersection points of the plurality of source lines and the plurality of gate lines; and a plurality of gate line drive circuits formed in the pixel region and connected to each of the plurality of gate lines, for controlling a potential of the gate line. At least a source line interrupted by any of the plurality of non-display parts, among the plurality of source lines, is supplied with the data signal from both ends thereof, and the plurality of source lines are each formed not to be interrupted by two or more of the plurality of non-display parts (first structure).

With the aforementioned structure, the plurality of gate line drive circuits are formed in the pixel region and connected to each of the gate lines. Hence, even when a gate line is interrupted by a non-display part, a signal can be supplied to the whole gate line.

The plurality of source lines are each formed not to be interrupted by two or more non-display parts. At least a source line interrupted by any of the plurality of non-display parts, among the plurality of source lines, is supplied with the data signal from both ends. Therefore, even when a source line is interrupted by one of the non-display parts, a source signal can be supplied to the whole source line.

Thus, even in the case where a plurality of non-display parts are formed in the pixel region, an image can be displayed in the whole pixel region except the non-display parts.

In the first structure, the plurality of non-display parts may each be a hole (second structure).

In the first or second structure, preferably, the plurality of gate lines are each formed not to be interrupted by two or more of the plurality of non-display parts (third structure).

With the aforementioned structure, even when a plurality of non-display parts are present between gate line drive circuits, a signal can be supplied to the whole gate line.

In any of the first to third structures, the substrate may have a non-rectangular shape (fourth structure).

In any of the first to fourth structures, the display device may further include: a counter substrate facing the substrate; and a liquid crystal layer sandwiched between the substrate and the counter substrate (fifth structure).

In the fifth structure, preferably, an angle between each of the plurality of gate lines and each of the plurality of source lines is 45 degrees to 89 degrees, and a transparent electrode is provided on the gate line or the source line in the pixel region (sixth structure).

When the gate line and the source line are inclined with respect to each other, any of the bus lines may cross a pixel. In such a case, the electric field of the bus line disturbs the liquid crystal molecular orientation, and causes a decrease in display quality. With the aforementioned structure, the transparent electrode is provided on the gate line or the source line. The provision of the transparent electrode on the bus line blocks any unwanted electric field, and prevents a decrease in display quality.

In the fifth structure, an angle between each of the plurality of gate lines and each of the plurality of source lines may be 45 degrees, and a drive mode of the display device may be a vertical alignment mode (seventh structure).

With the aforementioned structure, pixel design for orienting liquid crystal molecules in four directions can be easily realized even in high resolution. In detail, the liquid crystal molecules of the liquid crystal layer can be oriented in four directions by forming part of the pixel electrode to be parallel to the source line and the other part of the pixel electrode to be perpendicular to the source line.

EMBODIMENTS

Embodiments of the present invention are described in detail below with reference to the drawings. The same or corresponding components in the drawings are given the same reference signs, and their description is not repeated. In the drawings referenced below, structures are simplified or schematically illustrated and some structural members are omitted for ease of explanation. Moreover, the dimensional ratios between the structural members in each drawing do not necessarily represent the actual dimensional ratios.

First Embodiment

[Overall Structure]

FIG. 1 is a sectional view illustrating the schematic structure of a display device 1 according to a first embodiment of the present invention. The display device 1 includes an active-matrix substrate (substrate) 10, a counter substrate 20, a liquid crystal layer 30, and polarizers 31 and 32.

The active-matrix substrate 10 and the counter substrate 20 face each other. The liquid crystal layer 30 is sandwiched between the active-matrix substrate 10 and the counter substrate 20. The polarizer 31 is attached to the active-matrix substrate 10, and the polarizer 32 is attached to the counter substrate 20.

The active-matrix substrate 10 includes a plurality of pixel electrodes. The display device 1 controls the potential of each of the pixel electrodes to control the liquid crystal molecular orientation in the liquid crystal layer 30, thus displaying any image.

Figure 2:
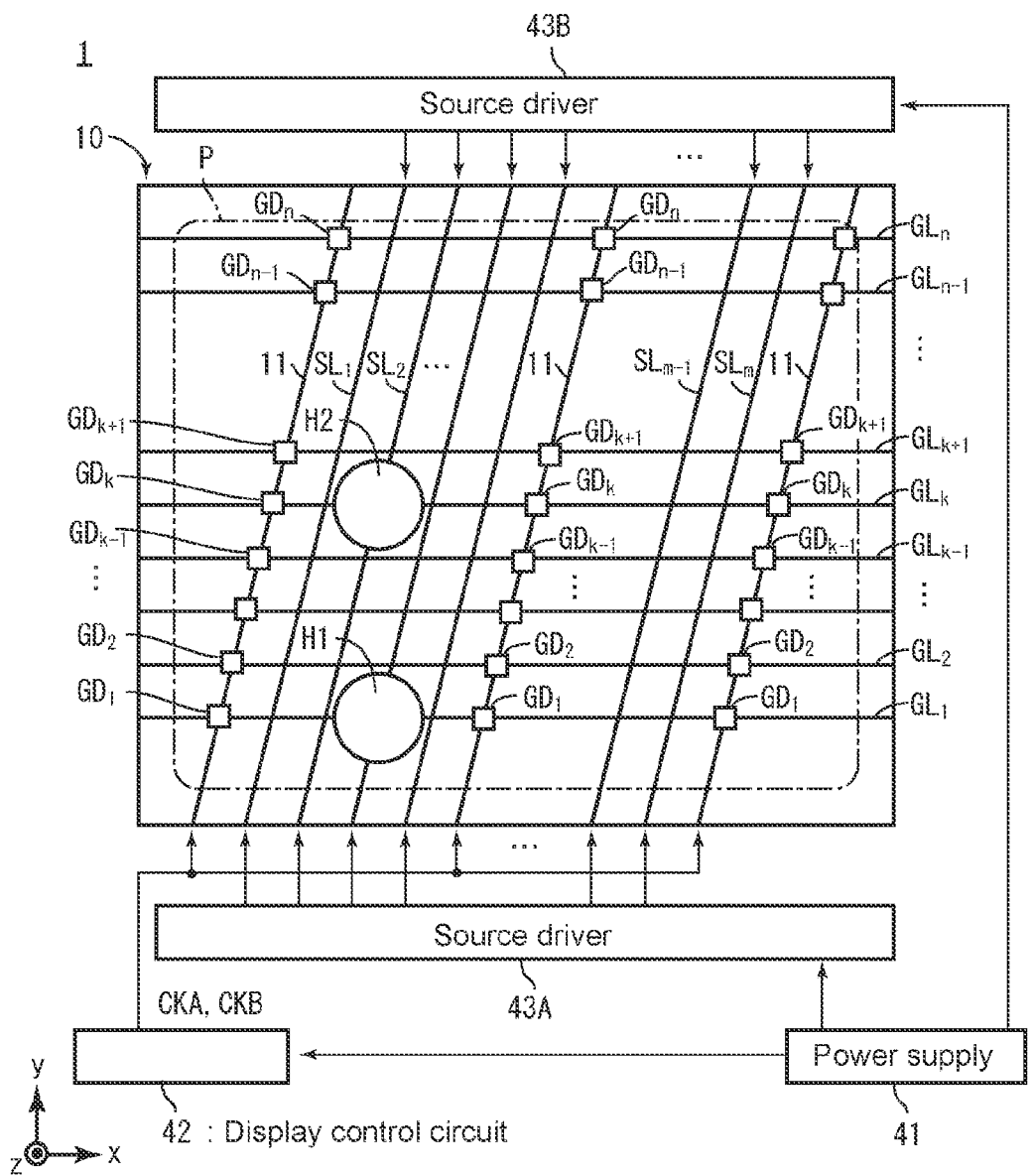
FIG. 2 is a block diagram illustrating the functional structure of the display device in FIG. 1.

FIG. 2 is a block diagram illustrating the functional structure of the display device 1. The display device 1 further includes a power supply 41, a display control circuit 42, and source drivers 43A and 43B. The power supply 41 supplies power to the display control circuit 42 and the source drivers 43A and 43B.

m source lines $SL_1$, $SL_2$, ..., $SL_m$, n gate lines $GL_1$, $GL_2$, ..., $GL_n$, the plurality of pixel electrodes (not illustrated), and a plurality of signal lines 11 are formed in the active-matrix substrate 10. In the following description, the source lines $SL_1$, $SL_2$, ..., $SL_m$ may be simply referred to as "source lines SL" without distinguishing them. Likewise, the gate lines $GL_1$, $GL_2$, ..., $GL_n$ may be simply referred to as "gate lines GL" without distinguishing them.

The source lines $SL_1$, $SL_2$, ..., $SL_m$ are formed parallel to each other at approximately regular intervals. The gate lines $GL_1$, $GL_2$, ..., $GL_n$ are formed parallel to each other at approximately regular intervals, in a direction crossing the source lines $SL_1$, $SL_2$, ..., $SL_m$.

The plurality of pixel electrodes are formed at the respective intersection points of the source lines $SL_1$, $SL_2$, ..., $SL_m$ and the gate lines $GL_1$, $GL_2$, ..., $GL_n$. The display device 1 displays an image by controlling the potential of each pixel electrode, as mentioned above. In other words, the display device 1 displays an image in the region where the pixel electrodes are formed. This region is hereafter referred to as "pixel region P".

Here, the horizontal direction (x direction) and the vertical direction (y direction) are defined with reference to the image displayed in the pixel region P. In more detail, the horizontal direction of the image is the direction linking an observer's right and left eyes when the observer faces the display device, and the vertical direction of the image is an in-plane direction of the display device and orthogonal to the horizontal direction.

Although the gate lines $GL_1, GL_2, \ldots, GL_n$ are parallel to the horizontal direction in this embodiment, the gate lines $GL_1, GL_2, \ldots, GL_n$ may be not parallel to the horizontal direction. Although the external shape of the active-matrix substrate 10 is along the vertical direction and the horizontal direction in this embodiment, the external shape of the active-matrix substrate 10 may be inclined with respect to the vertical direction and the horizontal direction.

The active-matrix substrate 10 has a plurality of non-display parts in the pixel region P. A non-display part mentioned here is a part where at least one of the source lines $SL_1, SL_2, \ldots, SL_m$ and the gate lines $GL_1, GL_2, \ldots, GL_n$ is interrupted and an image is not displayed. The non-display part is, for example, a hole, a notch, or the like. The hole may or may not pass through the active-matrix substrate 10. In the case where the active-matrix substrate 10 has a complex external shape such as a wavy shape, a clover, or a heart, too, the present technique is equally applicable with the interrupted part being a "non-display part".

In detail, holes H1 and H2 are formed in the active-matrix substrate 10. The holes H1 and H2 interrupt part of the source lines $SL_1, SL_2, \ldots, SL_m$ and part of the gate lines $GL_1, GL_2, \ldots, GL_n$.

The holes H1 and H2 are aligned in the vertical direction. In other words, the holes H1 and H2 overlap each other when projected onto the x axis.

The source lines $SL_1, SL_2, \ldots, SL_m$ are each formed not to be interrupted by two or more non-display parts. In more detail, the source lines $SL_1, SL_2, \ldots, SL_m$ are inclined by a predetermined angle from the vertical direction so that no source line is interrupted by both of the holes H1 and H2.

The source lines $SL_1, SL_2, \ldots, SL_m$ each have one end connected to the source driver 43A, and the other end connected to the source driver 43B. The source lines $SL_1, SL_2, \ldots, SL_m$ are each supplied with a data signal from the source drivers 43A and 43B.

The gate lines $GL_1, GL_2, \ldots, GL_n$ are each connected with a plurality of gate line drive circuits. In more detail, a gate line $GL_K$ ($1 \leq k \leq n$) is connected with a plurality of gate line drive circuits $GD_K$. The plurality of gate line drive circuits $GD_k$ are formed in the pixel region P. The plurality of gate line drive circuits $GD_k$ are arranged at approximately regular intervals along the extending direction of the gate line $GL_k$.

The plurality of gate line drive circuits $GD_K$ each control the potential of the gate line $GL_k$ based on a control signal supplied from the display control circuit 42 via the signal line 11, and supplies a signal to a gate line drive circuit $GD_{k+1}$ of the subsequent row (where $1 \leq k \leq n-1$). While one signal line 11 appears to be connected to one gate line drive circuit $GD_k$ in FIG. 2, typically a plurality of signal lines are connected to one gate line drive circuit $GD_k$ as described later.

[Structure of Gate Line Drive Circuit]

Figure 3:
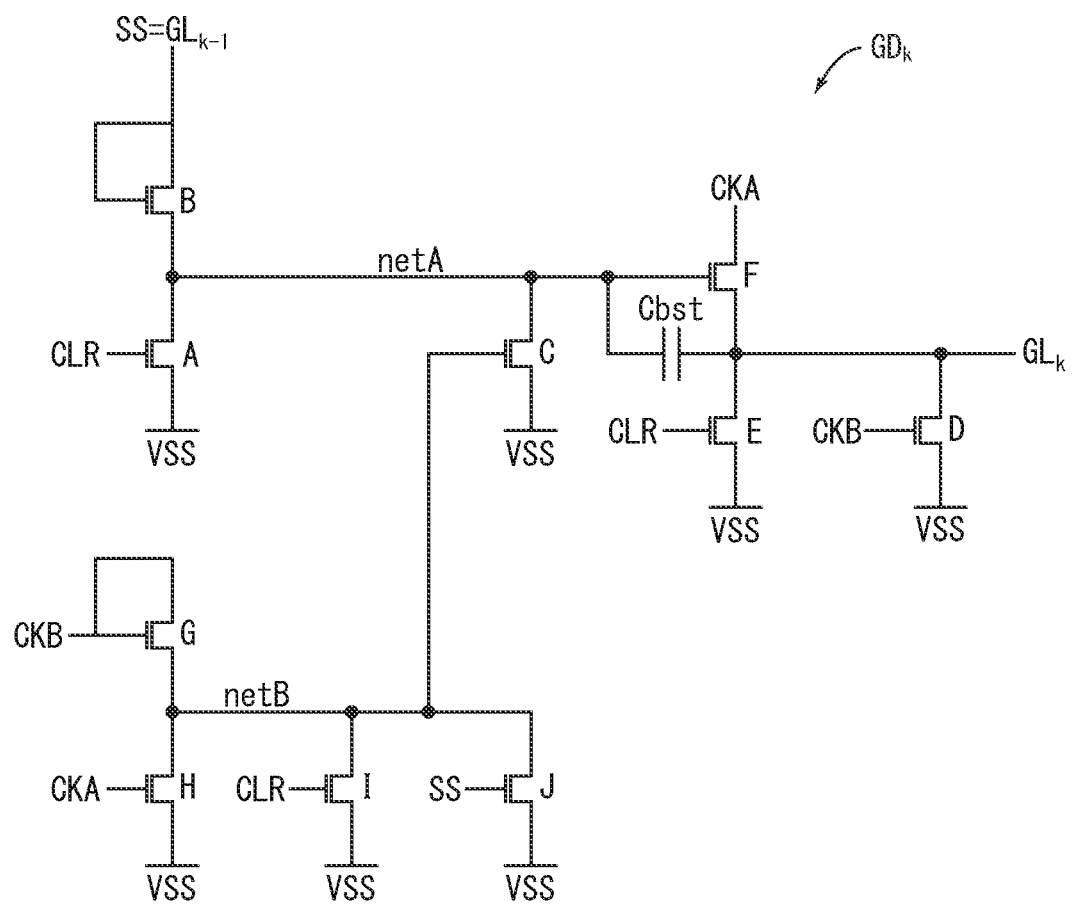
FIG. 3 is an equivalent circuit diagram of a gate line drive circuit.

The following describes an example of the structure of the gate line drive circuit $GD_k$. FIG. 3 is an equivalent circuit diagram of the gate line drive circuit $GD_k$. The gate line drive circuit $GD_k$ includes a plurality of thin-film transistors TFT-A to TFT-J, a capacitor Cbst, and lines netA and netB. The TFT-A to the TFT-J are indicated by the alphabet letters A to J in FIG. 3.

The gate line drive circuit $GD_k$ is supplied with clock signals CKA and CKB, a reset signal CLR, and a power supply voltage VSS from the display control circuit 42 (FIG. 2) via the signal line 11 (FIG. 2). The clock signals CKA and CKB are signals that are opposite in phase to each other and are each phase-inverted every horizontal scan interval (1H) (see FIG. 5). The reset signal CLR is a signal that goes to high level every vertical scan interval (1V) and remains high level for a predetermined period of time.

The gate line drive circuit $GD_K$ is further supplied with a set signal SS from the gate line drive circuit $GD_{k+1}$ of the preceding row (where $2 \leq k \leq n$). In the case where k=1, the gate line drive circuit $GD_1$ is supplied with a gate start pulse signal from the display control circuit 42 as the set signal SS.

The TFT-A has a gate supplied with the reset signal CLR, a source supplied with the power supply voltage VSS, and a drain connected to the line netA.

The TFT-B has a gate and a source supplied with the set signal SS, and a drain connected to the line netA.

The TFT-C has a gate connected to the line netB, a drain connected to the line netA, and a source supplied with the power supply voltage VSS.

The TFT-D has a gate supplied with the clock signal CKB, a source supplied with the power supply voltage VSS, and a drain connected to the gate line $GL_k$.

The TFT-E has a gate supplied with the reset signal CLR, a source supplied with the power supply voltage VSS, and a drain connected to the gate line $GL_k$.

The TFT-F has a gate connected to the line netA, a drain connected to the gate line $GL_k$, and a source supplied with the clock signal CKA.

The TFT-G has a gate and a source supplied with the clock signal CKB, and a drain connected to the line netB.

The TFT-H has a gate supplied with the clock signal CKA, a source supplied with the power supply voltage VSS, and a drain connected to the line netB.

The TFT-I has a gate supplied with the reset signal CLR, a source supplied with the power supply voltage VSS, and a drain connected to the line netB.

The TFT-J has a gate supplied with the set signal SS, a source supplied with the power supply voltage VSS, and a drain connected to the line netB.

The TFT-J is set to have a greater capacity than the TFT-G in, for example, any of the following manners (1) to (3):

(1) The TFT-J has a larger channel width than the TFT-G.

(2) The TFT-J has a shorter channel length than the TFT-G.

(3) The TFT-J has a larger channel width than the TFT-G, and a shorter channel length than the TFT-G.

The capacitor Cbst has one electrode connected to the line netA, and the other electrode connected to the gate line $GL_k$.

The line netA connects the drain of the TFT-A, the drain of the TFT-B, the drain of the TFT-C, the one electrode of the capacitor Cbt, and the gate of the TFT-F.

The line netB connects the gate of the TFT-C, the drain of the TFT-G, the drain of the TFT-H, the drain of the TFT-I, and the drain of the TFT-J.

The gate line drive circuits $GD_1$ to $GD_n$ have roughly the same structure, except that the clock signal supplied per line alternates between the clock signals CKA and CKB. In detail, in the gate line drive circuit adjacent to the gate line drive circuit $GD_k$, i.e. the gate line drive circuit $GD_{k-1}$ or $GD_{k+1}$ the clock signal supplied to the gate of the TFT-D is the clock signal CKA, the clock signal supplied to the source of the TFT-F is the clock signal CKB, the clock signal supplied to the source and gate of the TFT-G is the clock signal CKA, and the clock signal supplied to the gate of the TFT-H is the clock signal CKB.

Figure 4:
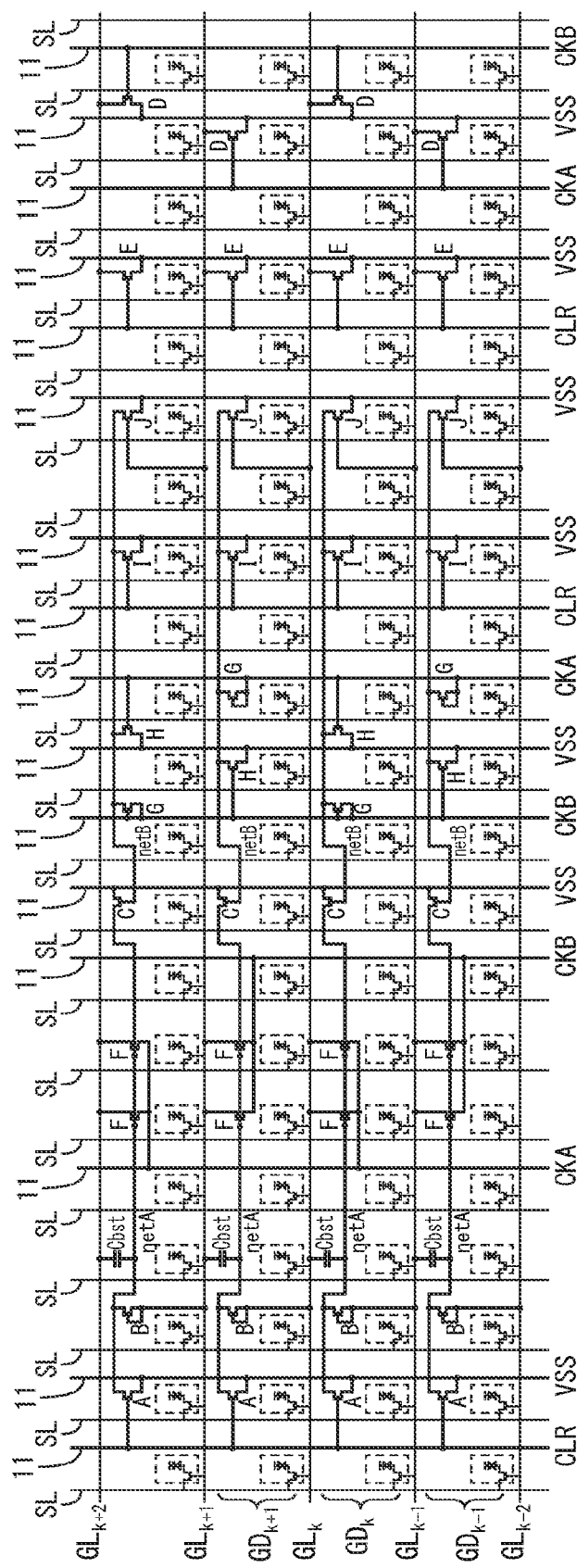
FIG. 4 is a schematic diagram illustrating an example of the arrangement of gate line drive circuits.

FIG. 4 is a schematic diagram illustrating an example of the arrangement of the gate line drive circuits. It is assumed in FIG. 4 that the gate lines $GL_1, GL_2, \ldots, GL_n$ and the source lines SL are orthogonal to each other, for simplicity's sake. The alphabet letters A to J in FIG. 4 correspond to the TFT-A to the TFT-J.

As illustrated in FIG. 4, the TFT-A to the TFT-J, the capacitor CBst, and the lines netA and netB constituting the gate line drive circuit $GD_k$ are distributed between the gate lines $GL_{k-1}$, and $GL_k$. Here, the signal line 11, the source line SL, and the lines netA and netB are formed in different layers from each other with an insulation film or the like in between, to prevent a short circuit.

[Operation of Gate Line Drive Circuit]

Figure 5:
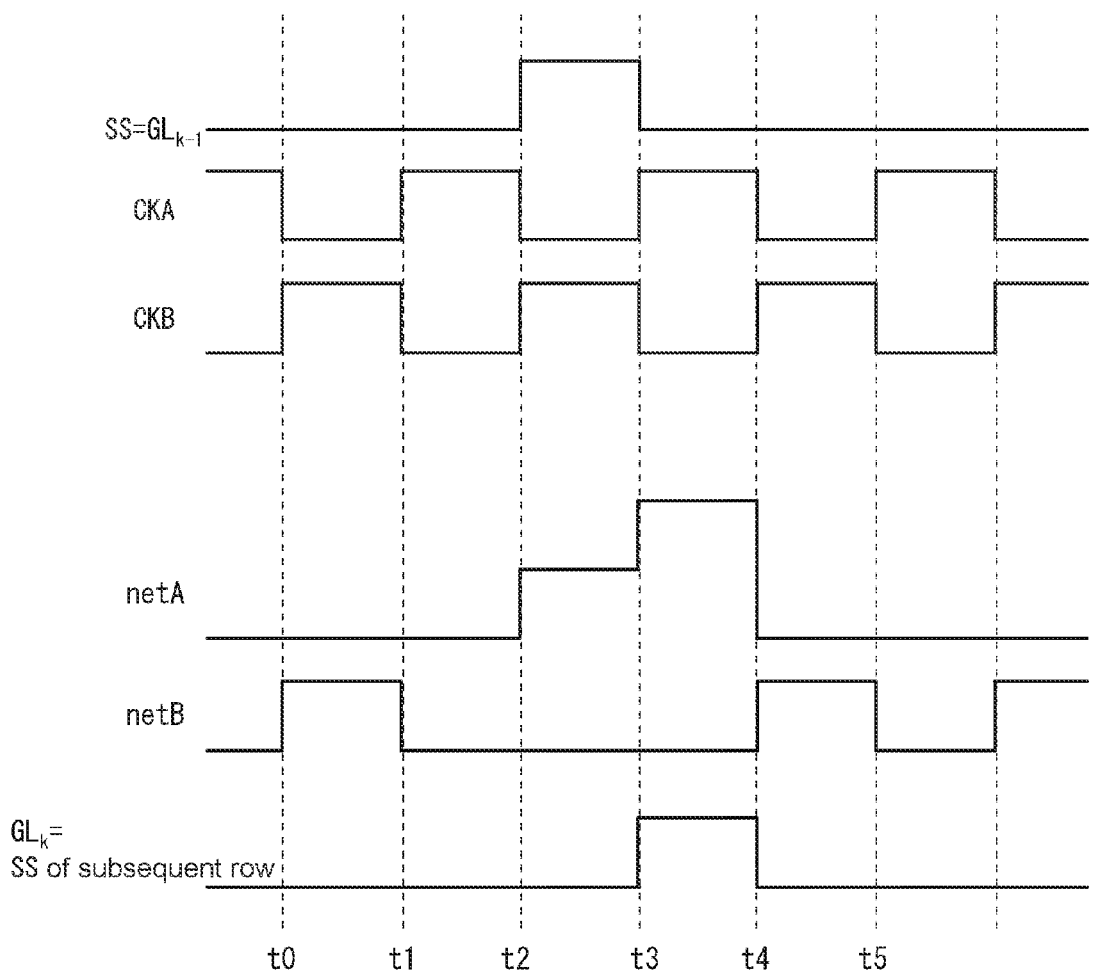
FIG. 5 is a timing chart illustrating the operation of the gate line drive circuit.

FIG. 5 is a timing chart illustrating the operation of the gate line drive circuit $GD_k$. As illustrated in FIG. 5, the set signal SS is high level in the period from time t2 to time t3. The reset signal CLR that goes to high level every horizontal scan interval and remains high level for a predetermined period of time is supplied to the gate line drive circuit, although not illustrated in FIG. 5. The transition of the reset signal CLR to high level causes the potentials of the lines netA and netB and gate line $GL_k$ to be low level.

In the period from time t0 to time t1, the clock signal CKA is low level, and the clock signal CKB is high level. In this period, the TFT-G is on, and the TFT-H, the TFT-I, and the TFT-J are off. Accordingly, the potential of the line netB is high level, and the TFT-C is on. The potential of the line netA is therefore low level. The TFT-D is on, and the potential of the gate line $GL_k$ is low level.

In the period from time t1 to time t2, the clock signal CKA is high level, and the clock signal CKB is low level. In this period, the TFT-H is on, and the TFT-G, the TFT-I, and the TFT-J are off. Accordingly, the potential of the line netB is low level, and the TFT-C is off. In this period, the potential of the line netA and the potential of the gate line $GL_k$ remain low level.

In the period from time t2 to time t3, the clock signal CKA is low level, and the clock signal CKB is high level. In this period, the TFT-J and the TFT-G are on, and the TFT-H and the TFT-I are off. Since the TFT-J has a greater capacity than the TFT-G, the potential of the line netB remains low level, and the TFT-C is off. The set signal SS turns the TFT-B on, causing the potential of the line netA to be the level obtained by subtracting the threshold voltage Vth of the TFT-B from the high level of the set signal SS. The TFT-D is on, and the potential of the gate line $GL_k$ is low level.

In the period from time t3 to time t4, the clock signal CKA is high level, and the clock signal CKB is low level. In this period, the TFT-H is on, and the TFT-G, the TFT-I, and the TFT-J are off. Accordingly, the line netB is low level, and the TFT-C is off. Moreover, in this period, the TFT-F is on, and the TFT-D is off. Hence, the potential of the gate line $GL_k$ goes to high level, and the potential of the line netA is raised.

In the period from time t4 to time t5, the clock signal CKA is low level, and the clock signal CKB is high level. In this period, the TFT-G is on, and the TFT-H, the TFT-I, and the TFT-J are off. Accordingly, the potential of the line netB is high level, and the TFT-C is on. The potential of the line netA therefore returns to low level. The TFT-D is on, and the potential of the gate line $GL_k$ returns to low level.

Thus, the gate lines $GL_1$ to $GL_n$ go to high level one by one per horizontal scan interval.

[Structure of Pixel Electrode]

Figure 6:
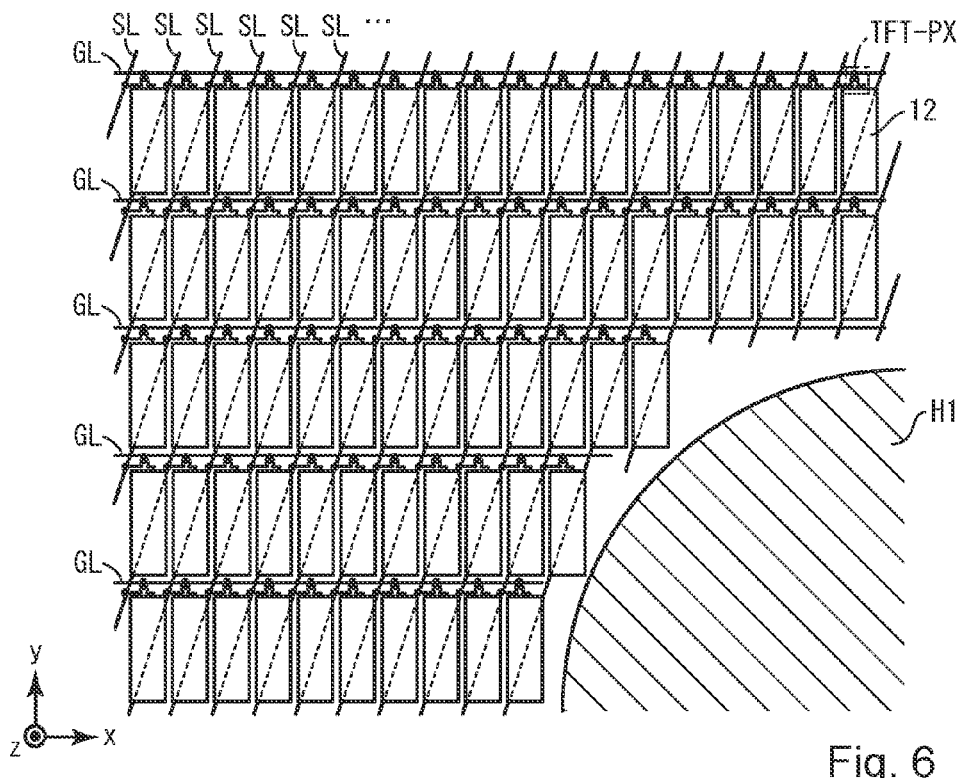
FIG. 6 is a plan view schematically illustrating the structure of pixel electrodes.

The following describes an example of the structure of the pixel electrodes. FIG. 6 is a plan view schematically illustrating the structure of the pixel electrodes 12 in this embodiment. The plurality of pixel electrodes 12 are arranged in a matrix along the vertical direction and the horizontal direction.

The plurality of pixel electrodes 12 are each connected to the source line SL and the gate line SL via a TFT-PX. The pixel electrode 12 is connected to the drain of the TFT-PX. The source line SL is connected to the source of the TFT-PX. The gate line GL is connected to the gate of the TFT-PX.

The source line SL is formed to diagonally pass the pixel electrode 12. The pixel electrode 12 has an aspect ratio of about 1:3. Hence, the source line SL crosses the gate line GL at an angle of arc $\tan(3/1) \approx 71.565$ degrees.

Figure 7:
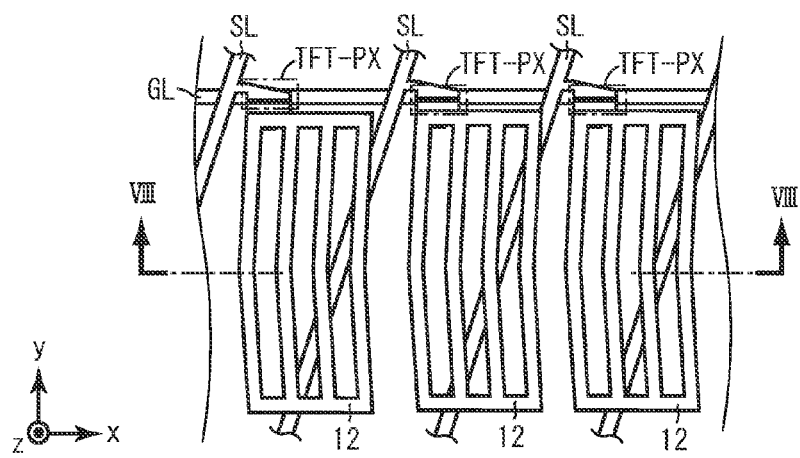
FIG. 7 is a plan view illustrating the structure of the pixel electrodes in more detail.
Figure 8:
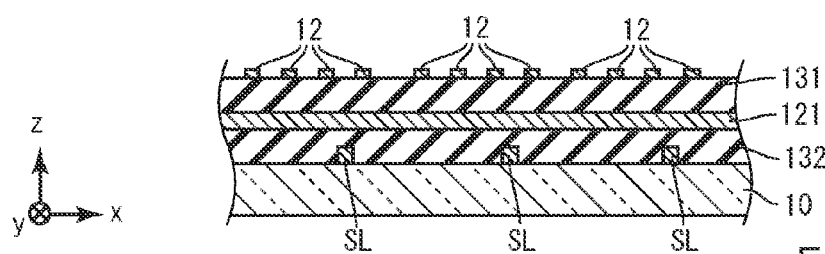
FIG. 8 is a sectional view along line VIII-VIII in FIG. 7.

FIG. 7 is a plan view illustrating the structure of the pixel electrodes 12 in more detail. FIG. 8 is a sectional view along line VIII-VIII in FIG. 7. In the active-matrix substrate 10, a common electrode 121 (FIG. 8) is formed approximately throughout the pixel region, in addition to the pixel electrodes 12. An interlayer insulation film 131 (FIG. 8) is formed between the common electrode 121 and the pixel electrodes 12, and an interlayer insulation film 132 (FIG. 8) is formed between the common electrode 121 and the source lines SL. Contact holes (not illustrated) are formed in the interlayer insulation films 131 and 132 and the common electrode 121. The pixel electrodes 12 and the source lines SL are in conduction with each other via the contact holes.

In this example, an electric field is formed in the liquid crystal layer 30 (FIG. 1) by the potential difference between each pixel electrode 12 and the common electrode 121. FIGS. 7 and 8 thus illustrate an example of the structure of the pixel electrodes in fringe field switching (FFS) mode. Note that FIGS. 7 and 8 merely illustrate an example, and the structure of the pixel electrodes in the display device 1 is not limited to such. A drive mode other than FFS mode may be used.

The drive mode is preferably FFS mode, twisted nematic (TN) mode, electrically controlled birefringence (ECB) mode, or UV²A® mode, although not limited to such. In this embodiment, the source line SL crosses the pixel electrode 12, as illustrated in FIGS. 6 and 7. In the case where the pixel electrode has a slit as in multi domain vertical alignment (MVA) mode or in plane switching (IPS) mode, the electric field of the bus line disturbs the liquid crystal molecular orientation, and causes a decrease in display quality. In FFS mode, TN mode, ECB mode, or UV²A mode, on the other hand, a transparent electrode can be placed on the bus line. This blocks any unwanted electric field. FFS mode is particularly preferable as a transparent electrode can be formed to cover the whole substrate.

[Advantageous Effects of Display Device 1]

Figure 9:
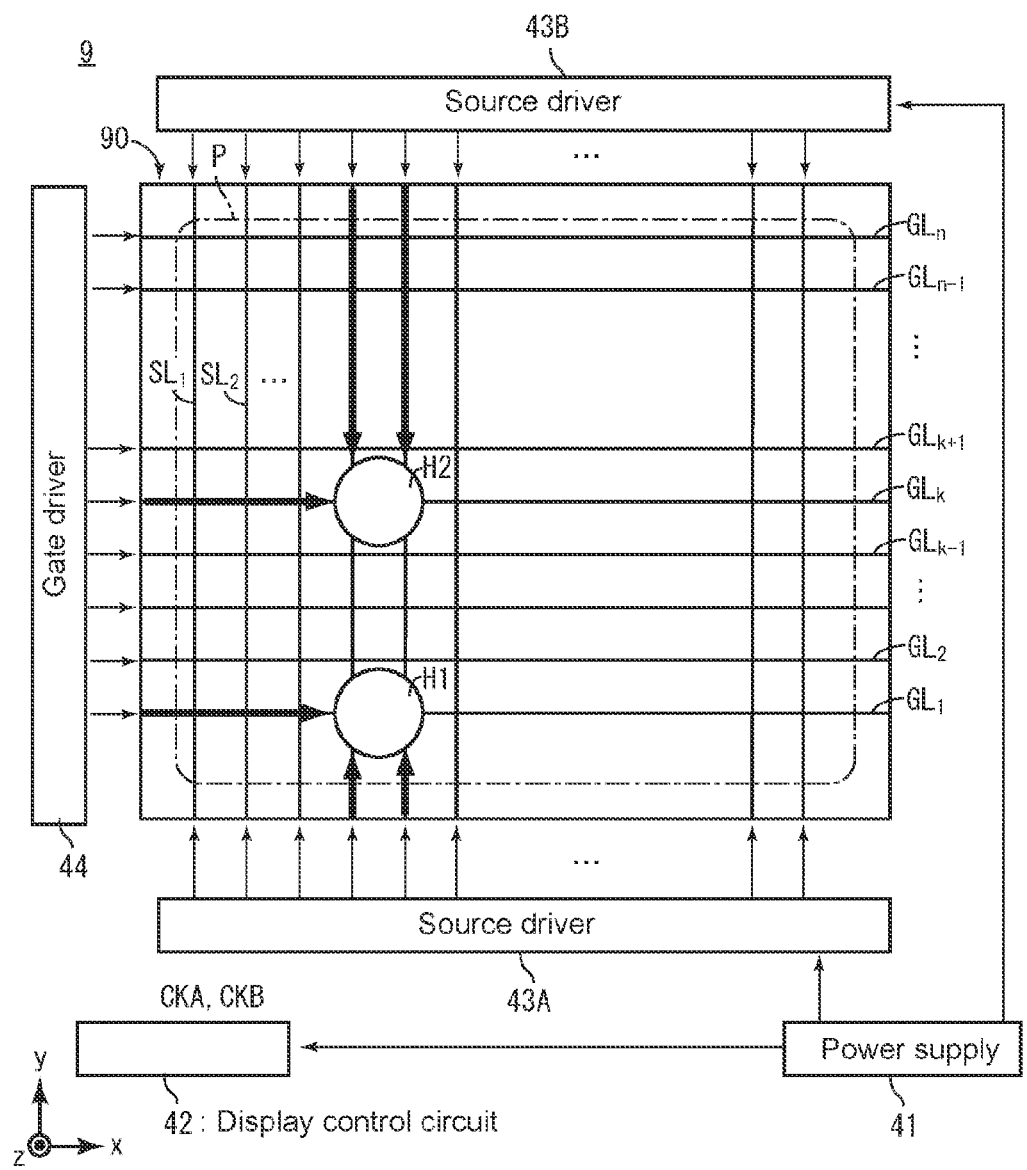
FIG. 9 is a block diagram illustrating the functional structure of a display device according to a comparative example.

The structure of the display device 1 has been described above. To describe the advantageous effects of the display device 1, a hypothetical comparative example is described here. FIG. 9 is a block diagram illustrating the functional structure of a display device 9 according to the comparative example. The display device 9 includes an active-matrix substrate 90, instead of the active-matrix substrate 10 (FIG. 2). The display device 9 further includes a gate driver 44 located outside the pixel region P.

In the active-matrix substrate 90, the source lines $SL_1$, $SL_2$, ..., $SL_m$ are parallel to the vertical direction, unlike in the active-matrix substrate 10. The gate lines $GL_1$, $GL_2$, ..., $GL_n$ are supplied with signals from the gate driver 44. The holes H1 and H2 aligned in the vertical direction are equally formed in the active-matrix substrate 90. The holes H1 and H2 interrupt part of the source lines $SL_1$, $SL_2$, ..., $SL_m$ and part of the gate lines $GL_1$, $GL_2$, ..., $GL_n$. Signals interrupted by the holes H1 and H2 are schematically indicated by arrows in FIG. 9.

In the display device 9, there is a region where a gate signal or a source signal cannot be supplied. In detail, in each gate line interrupted by the hole H1 or H2, a signal cannot be supplied to the side of the gate line farther from the gate driver 44. The source lines $SL_1, SL_2, \ldots, SL_m$ are each supplied with a data signal from both ends, but the data signal cannot be supplied to the region between the holes H1 and H2 because the holes H1 and H2 are aligned.

Figure 10:
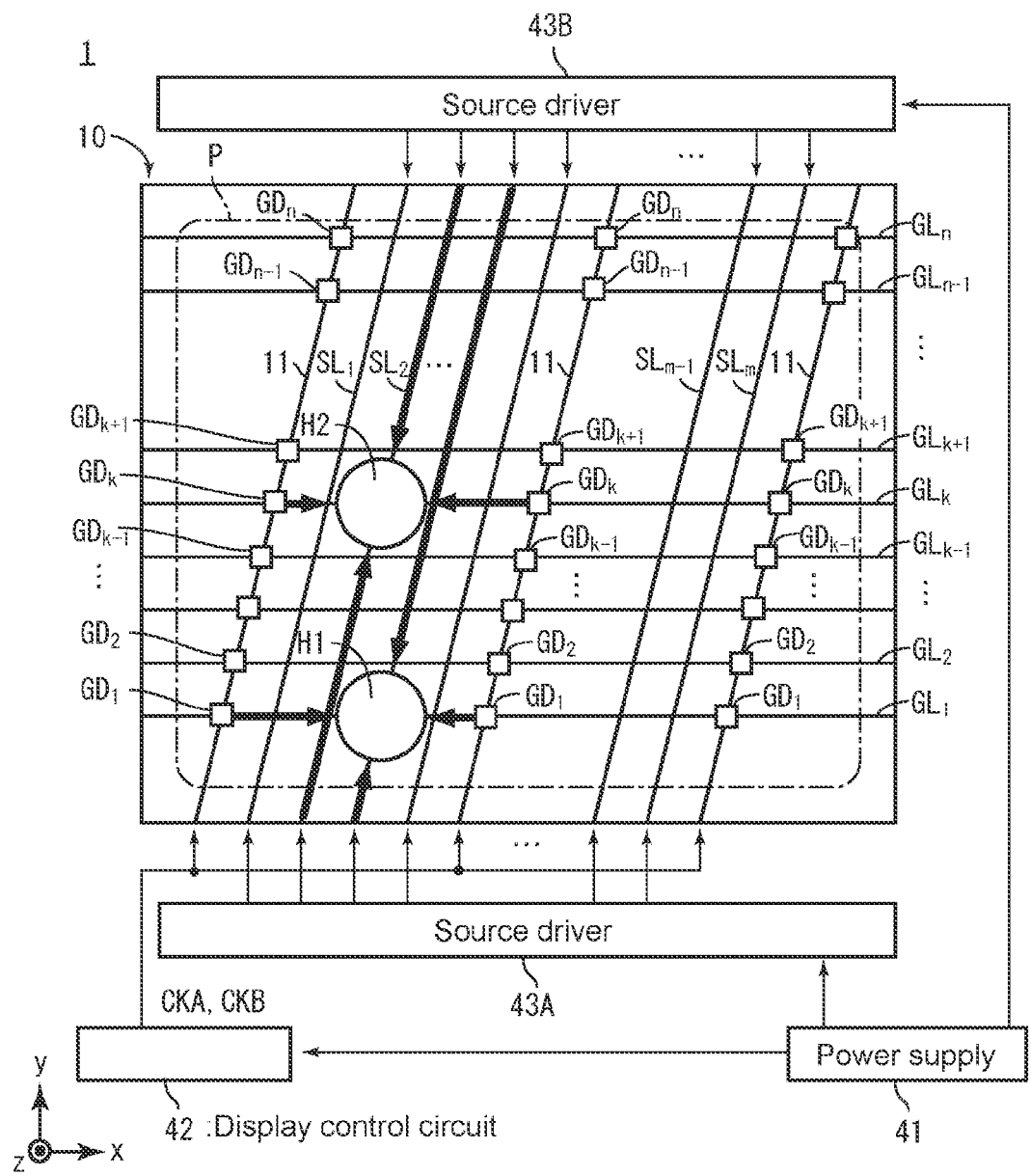
FIG. 10 is a block diagram illustrating the functional structure of the display device in FIG. 1.

FIG. 10 is a block diagram illustrating the functional structure of the display device 1 according to this embodiment. Signals interrupted by the holes H1 and H2 are schematically indicated by arrows in FIG. 10, as in FIG. 9.

In this embodiment, the plurality of gate line drive circuits are formed in the pixel region P, and connected to each gate line GL. Therefore, even when a gate line GL is interrupted by the hole H1 or H2, a signal can be supplied to the whole gate line GL. Meanwhile, each source line SL is formed not to be interrupted by two or more non-display parts. Hence, even when a source line SL is interrupted by the hole H1 or H2, a source signal can be supplied to the whole source line SL.

With the structure of this embodiment, even in the case where a plurality of non-display parts are formed in the pixel region P, an image can be displayed in the whole pixel region P except the non-display parts. In particular, an image can be displayed even in the case where the non-display parts are aligned in the vertical direction or the horizontal direction.

Modification of First Embodiment

Figure 11:
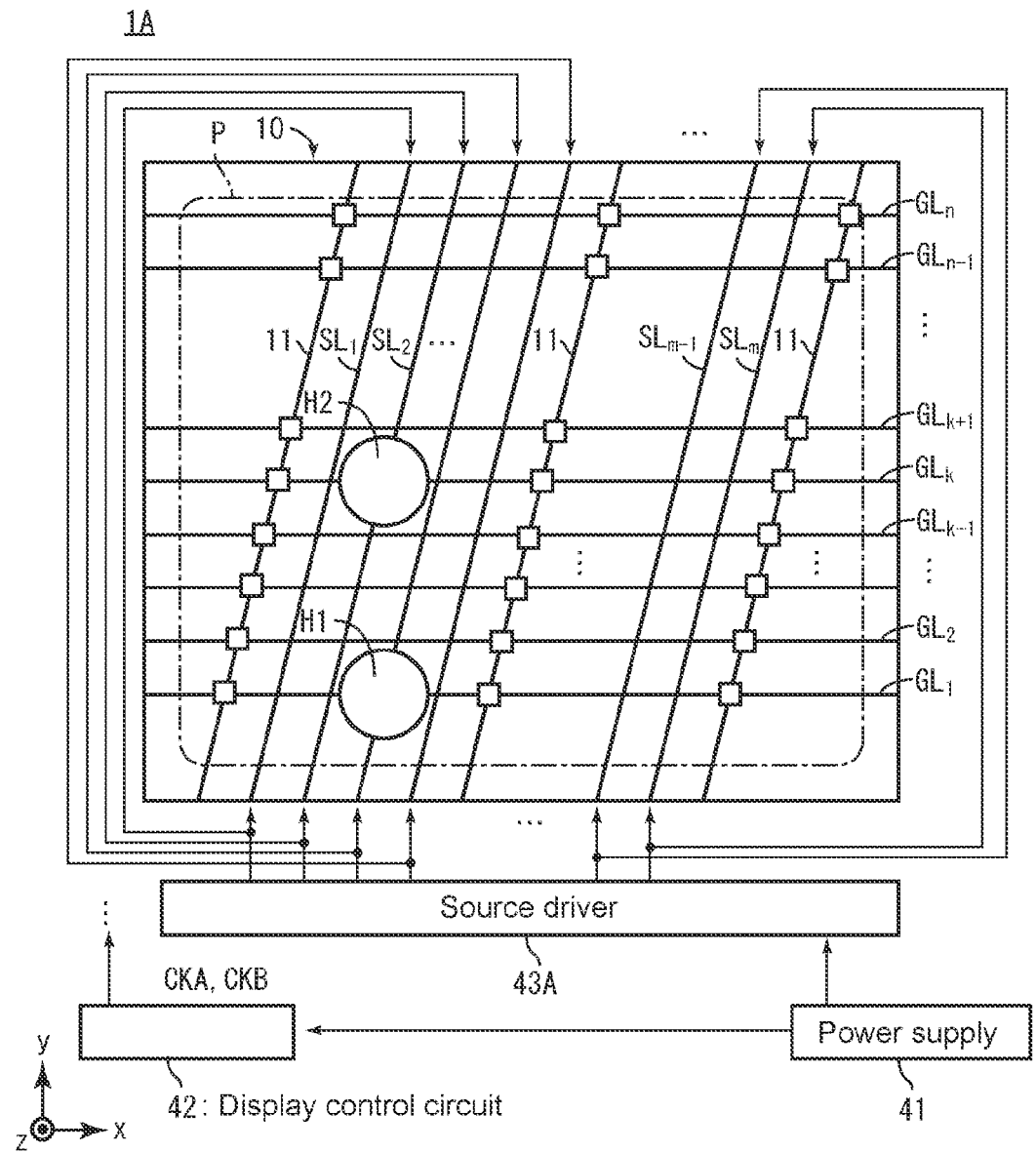
FIG. 11 is a block diagram illustrating the functional structure of a display device according to a modification of the display device in FIG. 1.

FIG. 11 is a block diagram illustrating the functional structure of a display device 1A according to a modification of the display device 1. In the display device 1 (FIG. 2), the two source drivers 43A and 43B are used to supply a data signal to both ends of each of the source lines $SL_1, SL_2, \ldots, SL_m$. In this modification, lines are routed from one source driver 43A to supply a data signal to both ends of each of the source lines $SL_1, SL_2, \ldots, SL_m$.

This modification has the same advantageous effects as the display device 1.

Second Embodiment

Figure 12:
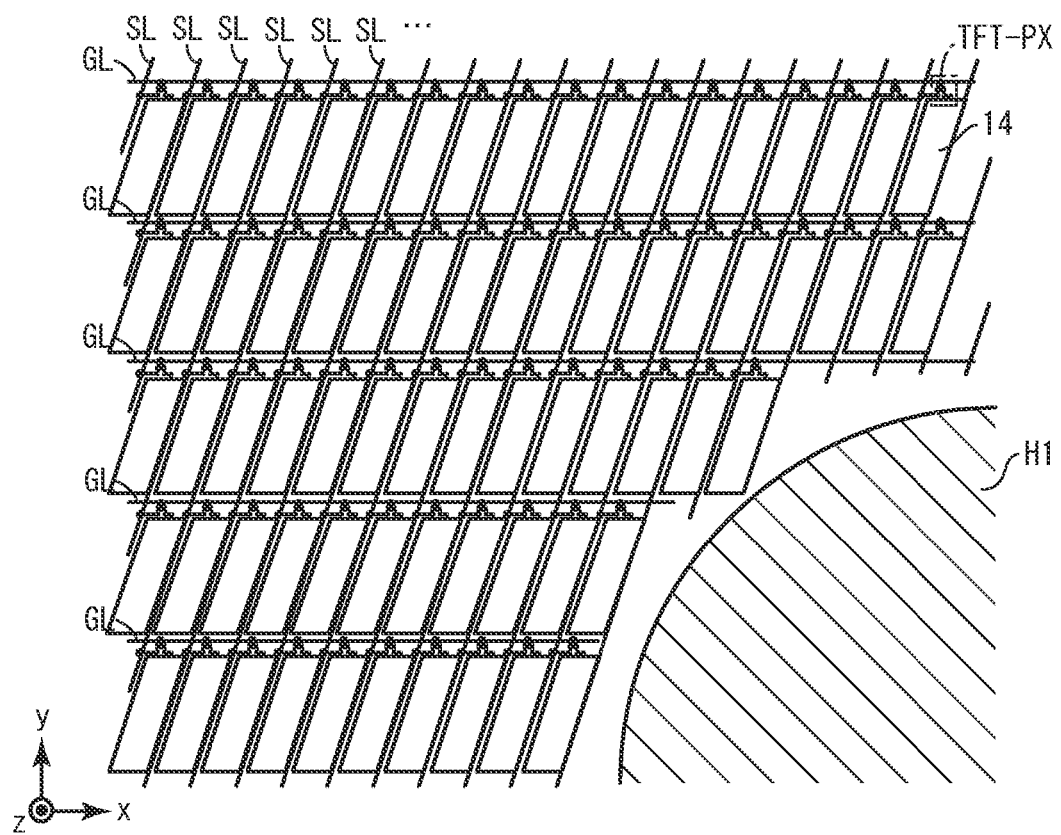
FIG. 12 is a plan view schematically illustrating the structure of pixel electrodes.

A display device according to a second embodiment of the present invention differs from the display device 1 in the structure of the pixel electrodes. FIG. 12 is a plan view schematically illustrating the structure of pixel electrodes 14 in this embodiment.

In the display device 1 (FIG. 6), the source line SL and the pixel electrode 12 overlap each other in a planar view. In this embodiment, the pixel electrode 14 is a parallelogram. In more detail, the right and left sides of the pixel electrode 14 are parallel to the source line SL.

Figure 13:
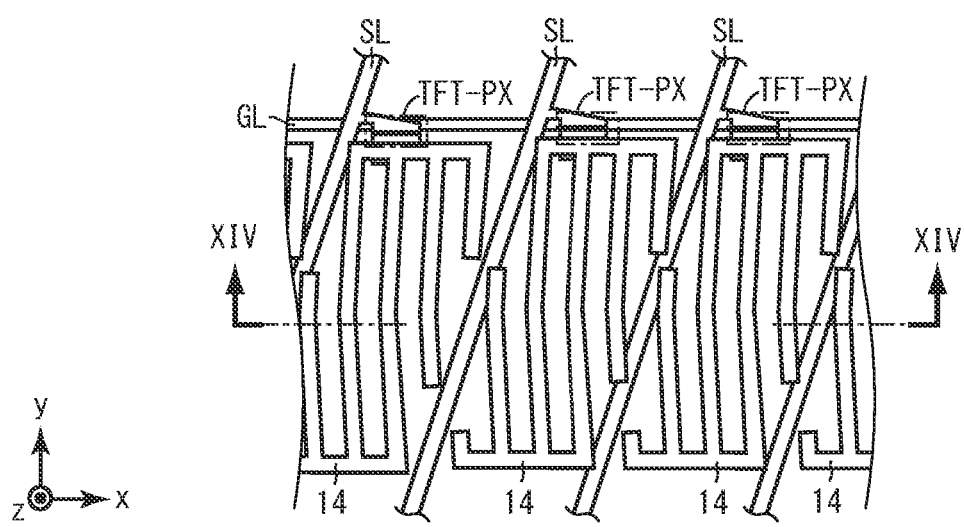
FIG. 13 is a plan view illustrating the structure of the pixel electrodes in more detail.
Figure 14:
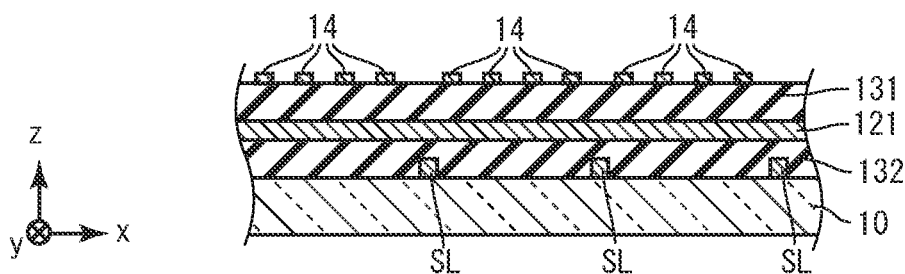
FIG. 14 is a sectional view along line XIV-XIV in FIG. 13.

FIG. 13 is a plan view illustrating the structure of the pixel electrodes 14 in more detail. FIG. 14 is a sectional view along line XIV-XIV in FIG. 13. FIG. 13 illustrates an example of the pixel structure in fringe field switching (FFS) mode, as in FIG. 7. In this example, the parallelogram pixel electrode 14 is realized by displacing two comb electrodes lying in different directions.

According to this embodiment, the pixel electrodes 14 and the source lines SL do not overlap each other in a planar view. This improves the aperture ratio as compared with the structure in FIG. 6.

Modification of Second Embodiment

Figure 15:
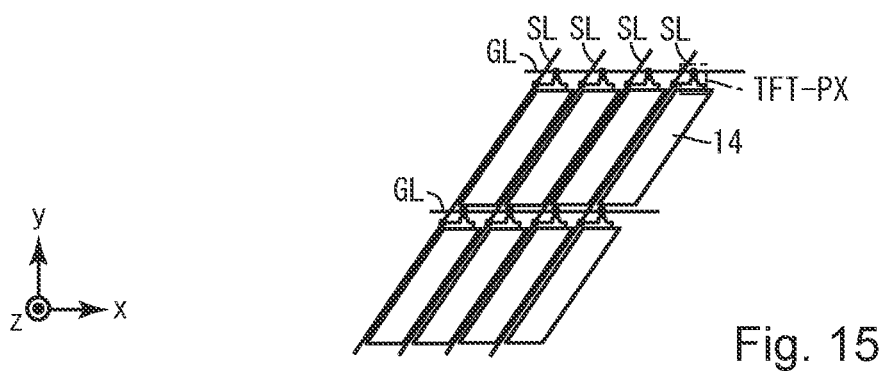
FIG. 15 illustrates an example where the angle between a source line and a gate line is arc tan(3/2)≈56.31 degrees.
Figure 16:
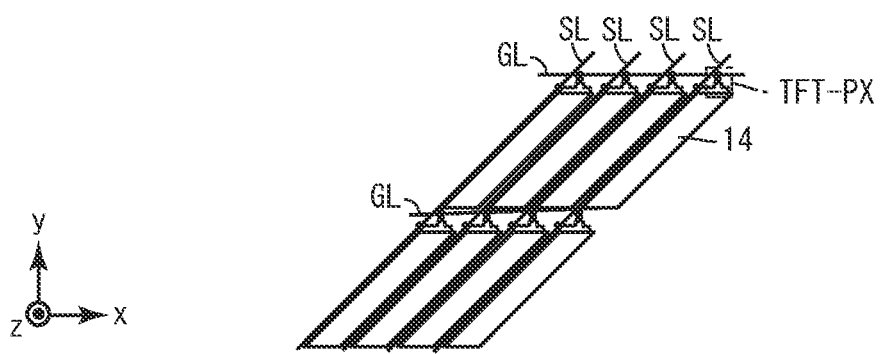
FIG. 16 illustrates an example where the angle between a source line and a gate line is arc tan(3/3)=45 degrees.

The angle of the source line SL can be set to any of various angles. FIG. 15 illustrates an example where the angle between the source line SL and the gate line GL is arc $\tan(3/2) \approx 56.31$ degrees. FIG. 16 illustrates an example where the angle between the source line SL and the gate line GL is arc $\tan(3/3) = 45$ degrees.

The following describes specific examples of the structure of the pixel electrodes in the case where the source line SL and the gate line GL cross at 45 degrees, in particular the structure of the pixel electrodes in a vertical alignment mode. The structure in which the source line SL and the gate line GL cross at 45 degrees is highly compatible with the vertical alignment mode, as described below.

Figure 17:
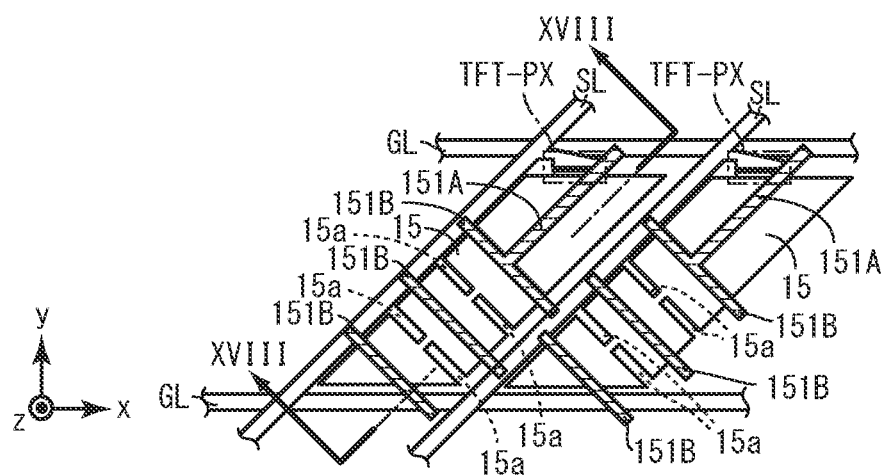
FIG. 17 is a plan view schematically illustrating an example of the structure of pixel electrodes in multi domain vertical alignment (MVA) mode.
Figure 18:
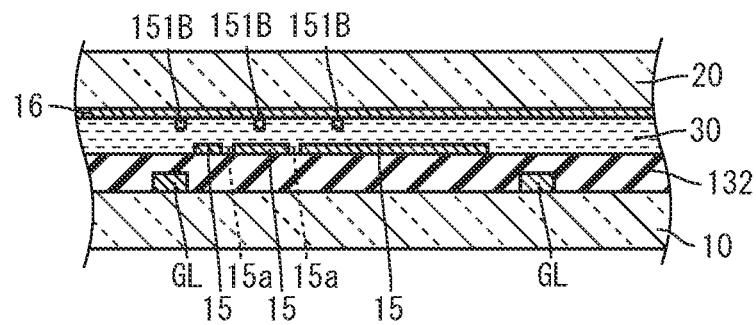
FIG. 18 is a sectional view along line XVIII-XVIII in FIG. 17.

FIG. 17 is a plan view schematically illustrating an example of the structure of the pixel electrodes in multi domain vertical alignment (MVA) mode which is one type of vertical alignment mode. FIG. 18 is a sectional view along line XVIII-XVIII in FIG. 17. In this example, pixel electrodes 15 are formed on the active-matrix substrate 10, and a counter electrode 16 (FIG. 18) and ribs 151A and 151B made of an insulator are formed on the counter substrate 20. The ribs 151A and 151B are hatched in FIG. 17 for ease of explanation.

Each pixel electrode 15 has a slit 15a perpendicular to the source line SL. The rib 151A is parallel to the source line SL, and the rib 151B is perpendicular to the source line SL.

In the vertical alignment mode, the active-matrix substrate 10 and the counter substrate 20 are coated with a vertical alignment film (not illustrated), and the liquid crystal molecules of the liquid crystal layer 30 are oriented in the vertical direction (z direction) in a non-voltage application state. When a signal is supplied to the pixel electrode 15, on the other hand, an electric field is formed in the liquid crystal layer 30, and the liquid crystal molecules tilt to directions perpendicular to the ribs or the electrode slit. Here, the liquid crystal molecules tilt to a total of four directions, that is, two directions of 135 degrees and 315 degrees between the side of the pixel electrode 15 at an angle of 45 degrees and the rib 151A and two directions of 45 degrees and 225 degrees between the slit in the pixel electrode 15 and the rib 151B. Tilting the liquid crystal molecules in four directions achieves a wide viewing angle in the vertical alignment mode.

As described above, in the case where the source line SL and the gate line GL cross at 45 degrees, the slit 15a is formed perpendicularly to the source line SL. The rib 151A is formed parallel to the source line SL, and the rib 151B is formed perpendicularly to the source line SL. Thus, the orientation direction can be divided into four directions even in high resolution.

Figure 19:
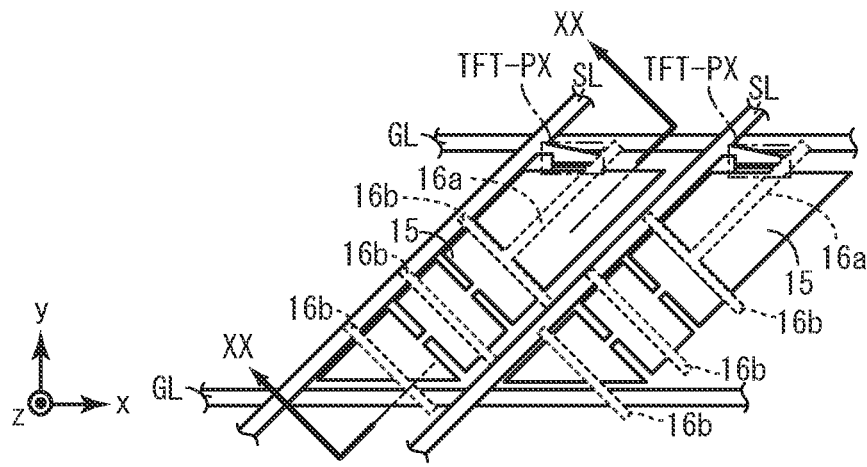
FIG. 19 is a plan view schematically illustrating an example of the structure of pixel electrodes in patterned vertical alignment (PVA) mode.
Figure 20:
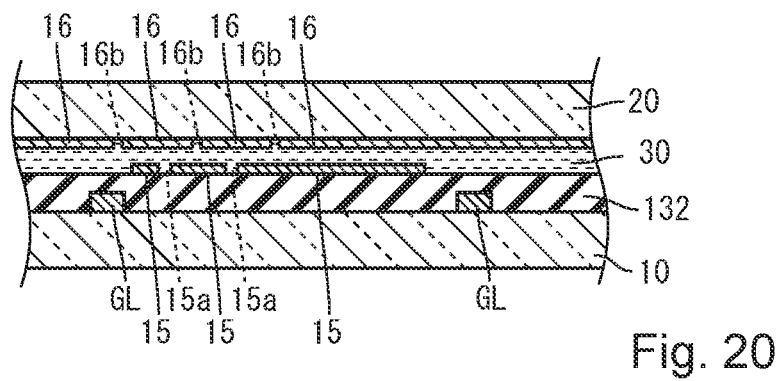
FIG. 20 is a sectional view along line XX-XX in FIG. 19.

FIG. 19 is a plan view schematically illustrating an example of the structure of the pixel electrodes in patterned vertical alignment (PVA) mode which is one type of vertical alignment mode. FIG. 20 is a sectional view along line XX-XX in FIG. 19. In this example, a counter electrode 16 (FIG. 20) is formed on the counter substrate 20, instead of the ribs 151A and 151B (FIG. 17) in MVA mode. The counter electrode 16 has slits 16a and 16b at the positions corresponding to the ribs 151A and 151B.

With the structure in FIG. 19, too, the liquid crystal molecular orientation direction can be divided into four directions. In this structure, too, the slits 15a and 16b are formed perpendicularly to the source line SL, and the slit 16a is formed parallel to the source line SL. Thus, the orientation direction can be divided into four directions even in high resolution.

Figure 21:
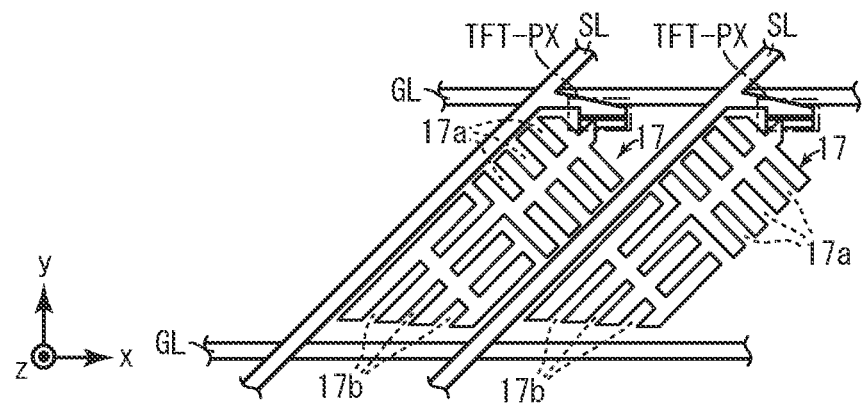
FIG. 21 is a plan view schematically illustrating an example of the structure of pixel electrodes in polymer sustained alignment (PSA) mode.

FIG. 21 is a plan view schematically illustrating an example of the structure of the pixel electrodes in polymer sustained alignment (PSA) mode which is one type of vertical alignment mode. In this example, pixel electrodes 17 are formed on the active-matrix substrate 10. Each pixel electrode 17 has fine slits 17a perpendicular to the source line SL and fine slits 17b parallel to the source line SL, and has a fine comb shape. Each of the slits 17a and 17b is narrower than the slit in MVA or PVA, and the electrode between the slits is narrower than that in MVA or PVA. Accordingly, when a voltage is applied between the counter electrode on the counter substrate and the pixel electrode, the liquid crystal molecules tilt to the direction of the fine electrode (fine slit). In the case where the fine comb electrode is formed in four directions as illustrated in FIG. 21, the liquid crystal molecules tilt to four directions according to the directions of the comb electrode.

With the structure in FIG. 21, too, the liquid crystal molecular orientation direction can be divided into four directions. In this structure, too, the fine slits 17a are formed perpendicularly to the source line SL, and the fine slits 17b are formed parallel to the source line SL. Thus, a long fine electrode can be provided and the orientation direction can be divided into four directions even in high resolution.

Third Embodiment

Figure 22:
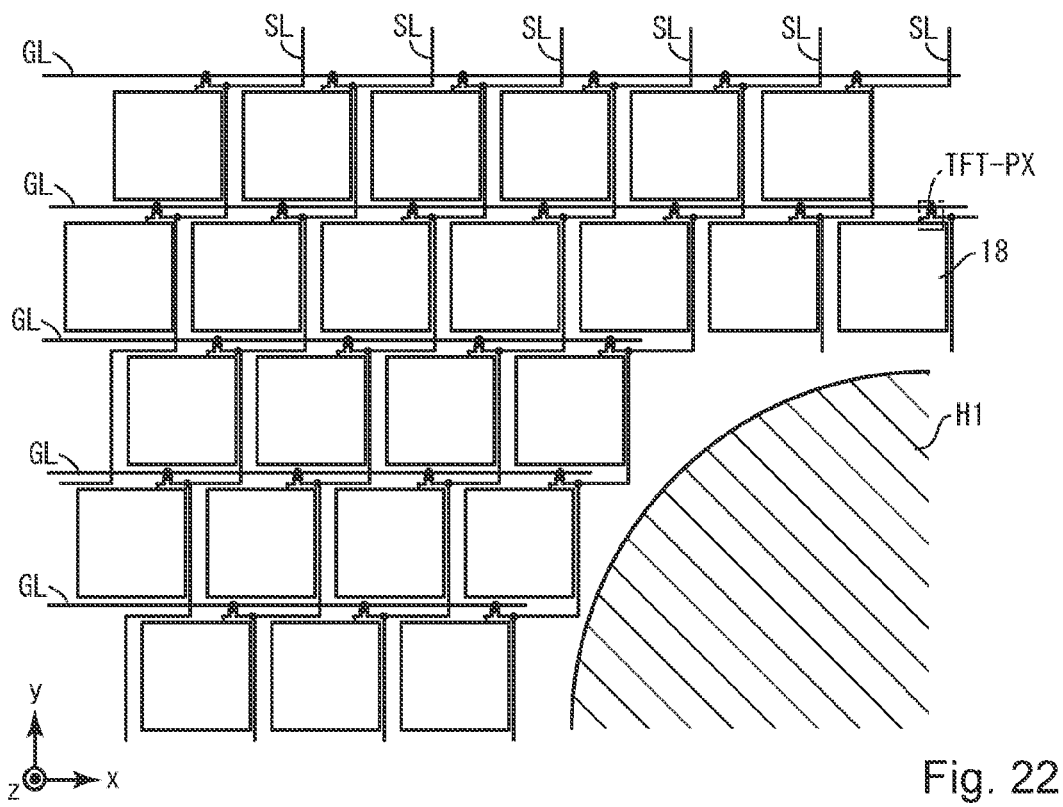
FIG. 22 is a plan view schematically illustrating the structure of pixel electrodes.

A display device according to a third embodiment of the present invention differs from the display device 1 in the structure of the pixel electrodes. FIG. 22 is a plan view schematically illustrating the structure of pixel electrodes 18 in this embodiment. The pixel electrodes 18 are shifted with a pitch of ½ in the horizontal direction per gate line GL. The source lines SL are accordingly stepped not to overlap the pixel electrodes 18.

According to this embodiment, too, the pixel electrode 18 and the source line SL do not overlap each other in a planar view, as in the second embodiment. This improves the aperture ratio as compared with the structure in FIG. 6.

Fourth Embodiment

Figure 23:
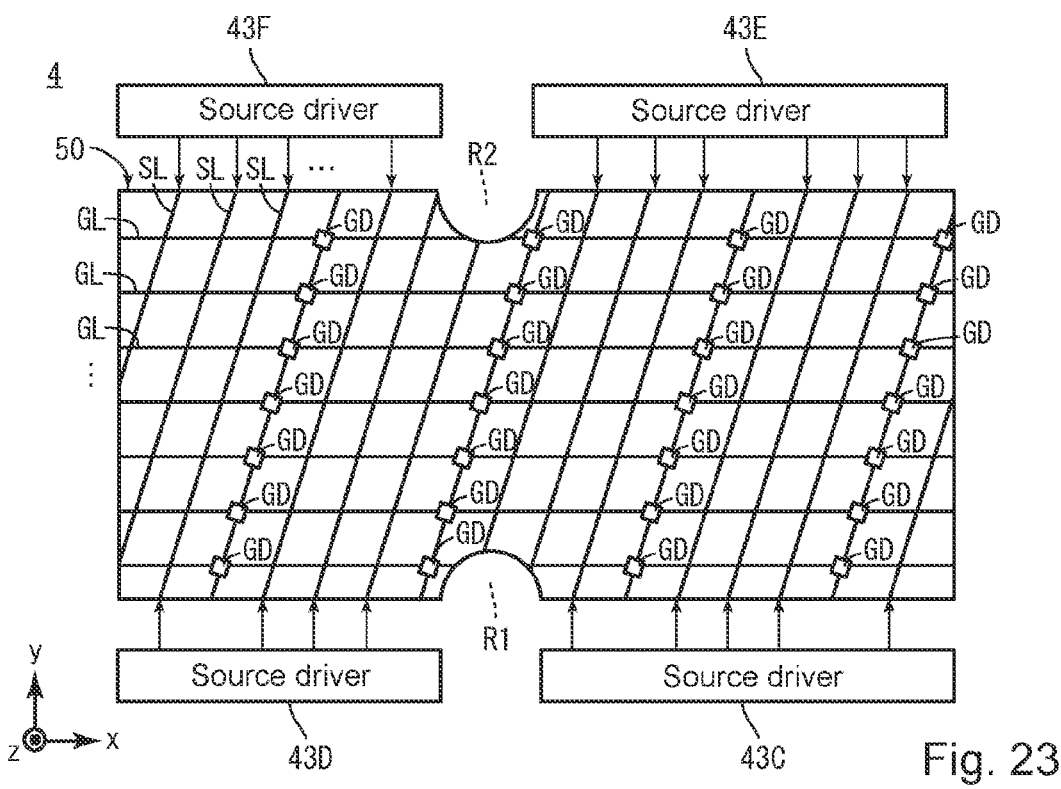
FIG. 23 is a block diagram illustrating the functional structure of a display device according to a fourth embodiment of the present invention.

FIG. 23 is a block diagram illustrating the functional structure of a display device 4 according to a fourth embodiment of the present invention. The display device 4 includes an active-matrix substrate 50, instead of the active-matrix substrate 10 (FIG. 2) in the display device 1. The display device 4 also includes source drivers 43C to 43F, instead of the source drivers 43A and 43B in the display device 1. The power supply 41 and the display control circuit 42 (see FIG. 2) same as those in the display device 1 are omitted in FIG. 23.

A plurality of source lines SL and a plurality of gate lines GL are formed in the active-matrix substrate 50, as in the active-matrix substrate 10. The plurality of source lines SL are supplied with data signals from the source drivers 43C to 43F. The plurality of source lines SL are each supplied with a data signal from both ends.

The active-matrix substrate 50 has notches R1 and R2 as non-display parts. The notch R1 is formed on the side of the active-matrix substrate 50 in the negative y direction, and the notch R2 is formed on the side of the active-matrix substrate 50 in the positive y direction. The notches R1 and R2 are aligned in the vertical direction. In other words, the notches R1 and R2 overlap each other when projected onto the x axis.

In this embodiment, too, a plurality of gate line drive circuits GD are formed in the pixel region, and connected to each gate line GL. Therefore, even when a gate line GL is interrupted by the notch R1 or R2, a signal can be supplied to the whole gate line GL. Meanwhile, each of the plurality of source lines SL is formed not to be interrupted by two or more non-display parts. Hence, even when a source line SL is interrupted by the notch R1 or R2, a source signal can be supplied to the whole source line SL.

Fifth Embodiment

Figure 24:
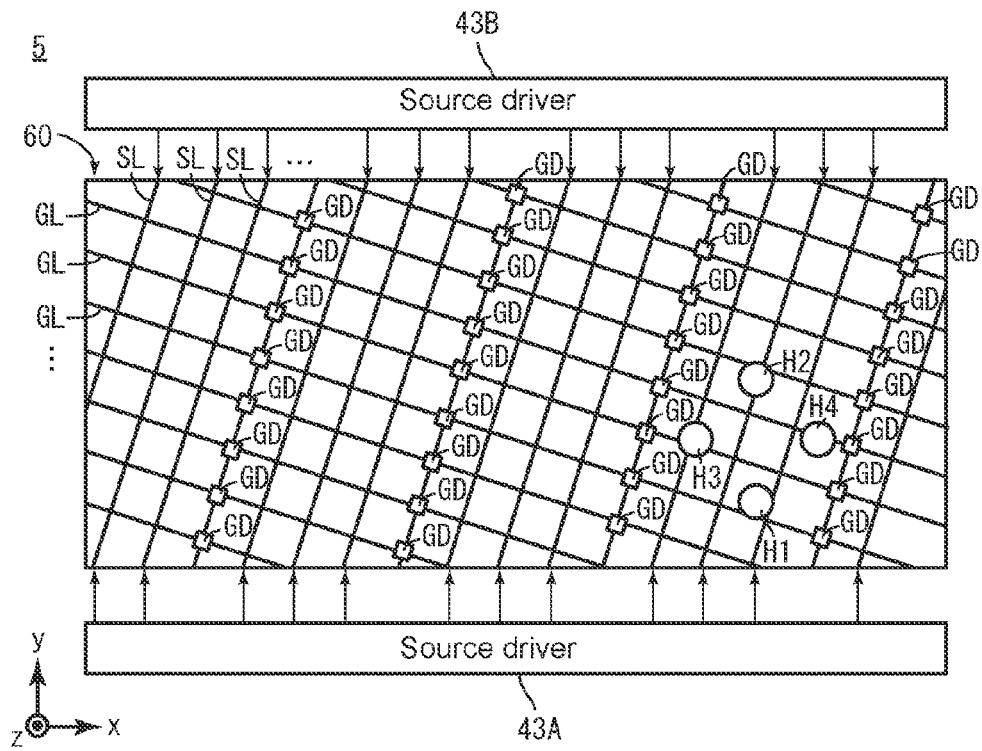
FIG. 24 is a block diagram illustrating the functional structure of a display device according to a fifth embodiment of the present invention.

FIG. 24 is a block diagram illustrating the functional structure of a display device 5 according to a fifth embodiment of the present invention. The display device 5 includes an active-matrix substrate 60, instead of the active-matrix substrate 10 (FIG. 2) in the display device 1. The power supply 41 and the display control circuit 42 (see FIG. 2) same as those in the display device 1 are omitted in FIG. 24.

A plurality of source lines SL and a plurality of gate lines GL are formed in the active-matrix substrate 60, as in the active-matrix substrate 10. The plurality of source lines SL are each supplied with a data signal from both ends.

The active-matrix substrate 60 has holes H3 and H4 in addition to the holes H1 and H2, as non-display parts. The holes H1 to H4 are arranged in the shape of a cross. In detail, the holes H1 and H2 are aligned in the vertical direction, and the holes H3 and H4 are aligned in the horizontal direction. In other words, the holes H1 and H2 overlap each other when projected onto the x axis, and the holes H3 and H4 overlap each other when projected onto the y axis.

In this embodiment, too, each of the plurality of source lines SL is formed not to be interrupted by two or more non-display parts. Hence, even when a source line SL is interrupted by one of the holes H1 to H4, a source signal can be supplied to the whole source line SL. Moreover, in this embodiment, each of the plurality of gate lines GL is inclined with respect to the horizontal direction. In more detail, each of the plurality of gate lines GL is formed not to be interrupted by two or more non-display parts.

In this embodiment, too, a plurality of gate line drive circuits GD are formed in the pixel region, and connected to each gate line GL. Therefore, even when a gate line GL is interrupted by one of the holes H1 to H4, a signal can be supplied to the whole gate line GL. In addition, in this embodiment, each of the plurality of gate lines GL is formed not to be interrupted by two or more non-display parts. Accordingly, a signal can be supplied to the whole gate line GL even when a plurality of non-display parts are present between gate line drive circuits GD.

Sixth Embodiment

Figure 25:
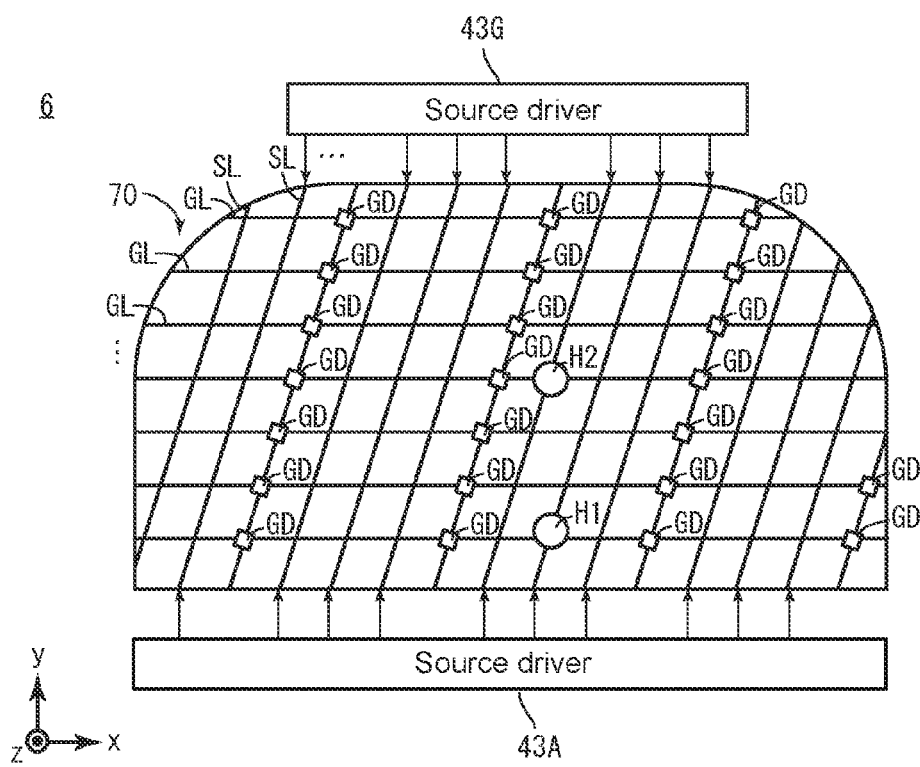
FIG. 25 is a block diagram illustrating the functional structure of a display device according to a sixth embodiment of the present invention.

FIG. 25 is a block diagram illustrating the functional structure of a display device 6 according to a sixth embodiment of the present invention. The display device 6 includes an active-matrix substrate 70, instead of the active-matrix substrate 10 (FIG. 2) in the display device 1. The display device 6 also includes a source driver 43G, instead of the source driver 43B (FIG. 2) in the display device 1. The power supply 41 and the display control circuit 42 (see FIG. 2) same as those in the display device 1 are omitted in FIG. 25.

The display device 6 has a non-rectangular external shape. The active-matrix substrate 70 accordingly has a non-rectangular external shape, too. In detail, both ends of one side of the active-matrix substrate 70 in the vertical direction are arc-shaped. The source driver 43G is located along the linear portion of this side of the active-matrix substrate 70.

A plurality of source lines SL and a plurality of gate lines GL are formed in the active-matrix substrate 70, as in the active-matrix substrate 10. The plurality of source lines SL are supplied with data signals from the source drivers 43A and 43G. Here, part of the source lines SL is supplied with a data signal only from the source driver 43A and not from the source driver 43G, as illustrated in FIG. 25.

The active-matrix substrate 70 has the holes H1 and H2 aligned in the vertical direction, as non-display parts. In this embodiment, too, each of the plurality of source lines SL is formed not to be interrupted by two or more non-display parts.

The holes H1 and H2 are formed in a region where a data signal is supplied from the source driver 43G. Thus, each source line SL interrupted by the hole H1 or H2 is supplied with a data signal from both ends. In other words, at least each source line SL interrupted by any non-display part, among the plurality of source lines SL, is supplied with a data signal from both ends.

In this embodiment, too, a plurality of gate line drive circuits GD are formed in the pixel region, and connected to each gate line GL. Therefore, even when a gate line GL is interrupted by the hole H1 or H2, a signal can be supplied to the whole gate line GL. Moreover, at least each source line SL interrupted by any non-display part, among the plurality of source lines SL, is supplied with a data signal from both ends. Each of the plurality of source lines SL is formed not to be interrupted by two or more non-display parts. Hence, even when a source line SL is interrupted by the hole H1 or H2, a source signal can be supplied to the whole source line SL.

Other Embodiments

While the embodiments of the present invention have been described above, the present invention is not limited to the foregoing embodiments, and various changes can be made within the scope of the present invention. The embodiments may also be combined as appropriate.

Although each of the foregoing embodiments describes the case where the plurality of non-display parts are each circular, the non-display part is not limited to a circular shape and may have any shape. Moreover, the plurality of non-display parts may differ in size and shape from each other.

The invention claimed is:

1. A display device comprising:
   a substrate including a plurality of non-display portions in a pixel region that displays an image;
   a plurality of source lines each supplied with a data signal from outside;
   a plurality of gate lines crossing the plurality of source lines;
   a plurality of pixel electrodes provided at respective intersection points of the plurality of source lines and the plurality of gate lines; and
   a plurality of gate line drive circuits provided in the pixel region and connected to each of the plurality of gate lines, that control a potential of the gate lines, wherein
   at least a source line interrupted by any of the plurality of non-display portions, among the plurality of source lines, is supplied with the data signal from both ends thereof in two different directions, and
   the plurality of source lines are each not interrupted by two or more of the plurality of non-display portions.

2. The display device according to claim 1, wherein the plurality of non-display portions are each a hole.

3. The display device according to claim 1, wherein the plurality of gate lines are each not interrupted by two or more of the plurality of non-display portions.

4. The display device according to claim 1, wherein the substrate has a non-rectangular shape.

5. The display device according to claim 1, further comprising:
   a counter substrate facing the substrate; and
   a liquid crystal layer sandwiched between the substrate and the counter substrate.

6. The display device according to claim 5, wherein an angle between each of the plurality of gate lines and each of the plurality of source lines is 45 degrees to 89 degrees, and
   a transparent electrode is provided on the gate line or the source line in the pixel region.

7. The display device according to claim 5, wherein an angle between each of the plurality of gate lines and each of the plurality of source lines is 45 degrees, and
   a drive mode of the display device is a vertical alignment mode.

8. The display device according to claim 1, further comprising a plurality of signal lines to supply a control signal, wherein
   the plurality of signal lines are arranged parallel to the source lines,
   the plurality of gate line drive circuits are connected to each of the plurality of signal lines, and
   the plurality of gate line drive circuits are arranged at approximately regular intervals along an extending direction of the gate lines.

* * * * *